US009876334B2

(12) United States Patent
Burke et al.

(10) Patent No.: US 9,876,334 B2
(45) Date of Patent: Jan. 23, 2018

(54) BREAKER ASSEMBLY WITH MATING PLATFORM AND WELL CONNECTION

(71) Applicant: Electronic Theatre Controls, Inc., Middleton, WI (US)

(72) Inventors: Kevin Burke, Madison, WI (US); John Thurk, Fitchburg, WI (US); John Udelhofen, Platteville, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 0 days.

(21) Appl. No.: 15/106,511

(22) PCT Filed: Dec. 30, 2014

(86) PCT No.: PCT/US2014/072660
§ 371 (c)(1),
(2) Date: Jun. 20, 2016

(87) PCT Pub. No.: WO2015/103196
PCT Pub. Date: Jul. 9, 2015

(65) Prior Publication Data
US 2017/0005458 A1  Jan. 5, 2017

Related U.S. Application Data

(60) Provisional application No. 61/923,416, filed on Jan. 3, 2014.

(51) Int. Cl.
*H02B 1/20* (2006.01)
*H02B 1/052* (2006.01)
*H02B 1/056* (2006.01)

(52) U.S. Cl.
CPC ............. *H02B 1/205* (2013.01); *H02B 1/052* (2013.01); *H02B 1/056* (2013.01)

(58) Field of Classification Search
CPC .......... H01H 7/08; H02B 1/052; H02B 1/056; H02B 1/205; H02B 1/041
(Continued)

(56) References Cited

U.S. PATENT DOCUMENTS 3,054,025 A * 9/1962 Edmunds ............. H01R 13/642
                                                   200/281
3,146,379 A * 8/1964 Giger, Jr. ............... H02B 1/056
                                                   361/635
(Continued)

FOREIGN PATENT DOCUMENTS

CA            2200900        9/1997
CA            2200906        9/1997
(Continued)

OTHER PUBLICATIONS

DEA351-A Series Lighting Control Panels, GE Consumer & Industrial, DEA-351 (02107), 8 pages.
(Continued)

*Primary Examiner* — Zachary M Pape
(74) *Attorney, Agent, or Firm* — Michael Best & Friedrich LLP

(57) ABSTRACT

A breaker assembly is disclosed comprising a breaker board having a bus bar including a first engagement feature and a breaker module having a line side connector including a second engagement feature engaging the first engagement feature to inhibit separation of the breaker module from the breaker board. The breaker board can further include a board mount having a first alignment feature, and the breaker module can further include a module mount engaging the board mount and having a second alignment feature engaging the first alignment feature. In another aspect of the invention, the breaker board includes board connections, the breaker module includes breaker connections (e.g., blind mate connections), and the board connections are engaged
(Continued)

with the breaker connections. In another aspect of the invention, the breaker module includes a ledge that defines an undercut to facilitate prying of the breaker module from the breaker board.

15 Claims, 14 Drawing Sheets

(58) Field of Classification Search
USPC .............. 361/634–635, 652–653, 655–656
See application file for complete search history.

(56) References Cited

U.S. PATENT DOCUMENTS

| | | | | |
|---|---|---|---|---|
| 3,404,316 | A * | 10/1968 | Jacobs | H01R 13/642 |
| | | | | 361/634 |
| 4,150,273 | A * | 4/1979 | Ciarcia | H01H 71/0264 |
| | | | | 200/295 |
| 4,368,444 | A | 1/1983 | Preuss et al. | |
| 4,446,503 | A | 5/1984 | Link et al. | |
| 4,518,838 | A | 5/1985 | Werner | |
| 4,802,059 | A | 1/1989 | Prietzel et al. | |
| 5,025,121 | A * | 6/1991 | Allen | H01H 1/38 |
| | | | | 200/254 |
| 5,179,491 | A * | 1/1993 | Runyan | H01H 73/08 |
| | | | | 335/18 |
| 5,375,036 | A | 12/1994 | Magdaleno | |
| 6,062,914 | A * | 5/2000 | Fasano | H01H 71/08 |
| | | | | 361/634 |
| 6,086,388 | A | 7/2000 | Sloey et al. | |
| 6,204,741 | B1 | 3/2001 | Becker et al. | |
| 6,244,891 | B1 | 6/2001 | Robbins et al. | |
| 6,266,232 | B1 | 7/2001 | Rose et al. | |
| 6,315,580 | B1 * | 11/2001 | Hurtubise | H01H 73/08 |
| | | | | 361/627 |
| 7,553,175 | B1 * | 6/2009 | Benson | H02B 1/056 |
| | | | | 361/637 |
| 7,957,122 | B2 * | 6/2011 | Sharp | H02B 1/056 |
| | | | | 174/67 |
| 8,049,126 | B2 * | 11/2011 | Chen | H01H 1/5866 |
| | | | | 200/244 |
| 9,184,525 | B1 * | 11/2015 | Ranta | H01R 13/20 |
| 2006/0060456 | A1 | 3/2006 | Sabisch | |

FOREIGN PATENT DOCUMENTS

| | | |
|---|---|---|
| CA | 2200909 | 9/1997 |
| CA | 2200913 | 9/1997 |
| CA | 2200907 | 12/2005 |
| CA | 2200912 | 12/2005 |
| CA | 2200908 | 1/2006 |
| CA | 2200914 | 1/2006 |
| CA | 2200910 | 6/2007 |
| DE | 1130036 | 5/1962 |
| DE | 4003408 | 8/1991 |
| EP | 0897186 | 2/1999 |
| EP | 1139531 | 10/2001 |
| GB | 2312797 | 11/1997 |
| MX | 2010013063 | 12/2010 |
| WO | 0067273 | 11/2000 |
| WO | 0067278 | 11/2000 |

OTHER PUBLICATIONS

International Preliminary Report on Patentability and Written Opinion for Application No. PCT/US2014/072660 dated Jul. 5, 2016 (9 pages).

Search Report for Application No. PCT/US2014/072660 dated Mar. 23, 2015 (4 pages).

* cited by examiner

BREAKER ASSEMBLY WITH MATING PLATFORM AND WELL CONNECTION

CROSS-REFERENCE TO RELATED APPLICATIONS

This application is a national stage filing under 35 U.S.C. § 371 of International Application No. PCT/US2014/072660, filed Dec. 30, 2014, which claims priority to U.S. Provisional Patent Application No. 61/923,416, filed Jan. 3, 2014, the entire contents of which are incorporated by reference herein.

BACKGROUND

The present invention relates to electrical circuit breakers and methods for using circuit breakers.

Circuit breakers are electrical switches that are commonly used to protect an electrical circuit from damage caused by too much current, such as can result from an overload or short circuit condition. Circuit breakers are typically designed to automatically trip open when an undesired condition is encountered, and they can also be reset to the closed position when the undesired condition is removed.

Some circuit breakers can be controlled (e.g., manually tripped or reset) remotely, while others must be controlled locally (e.g., physically at the breaker). For remotely-controllable breakers, solenoids are often used to facilitate remotely tripping or resetting the breaker.

SUMMARY

The present invention provides a breaker assembly comprising a breaker board having a bus bar including a first engagement feature (e.g., a recess) and a breaker module having a line side connector including a second engagement feature (e.g., a protrusion) engaging the first engagement feature to provide inhibit separation of the breaker module from the breaker board. The first and second engagement features can also provide a tactile and auditory indication (e.g., a snap) that the breaker module has fully seated into the breaker board. Preferably, the line side connector includes two resilient conductors spaced apart a distance less than a thickness of the bus bar. In one embodiment, the breaker board further includes a board mount (e.g., a mounting rail) spaced from the bus bar, and the breaker module further includes a module mount (e.g., a pivot mount) engaging (e.g., pivotally engaging) the mounting rail. The module mount can include a first alignment feature (e.g., an alignment recess), and the board mount can include a second alignment feature (e.g., an alignment web) engaging the first alignment feature.

In another aspect of the invention, the breaker board further includes board connections positioned between the board mount and the bus bar, the breaker module further includes breaker connections positioned between the module mount and the line side connector, and the board connections are engaged with the breaker connections. Preferably, the breaker connections are blind mate connections positioned along a back side of the breaker module.

In another aspect of the invention, the line side connector is adjacent a first end of the breaker module, the module mount is adjacent a second opposing end of the breaker module, and the breaker module further comprises a ledge positioned adjacent the first end (e.g., adjacent a front side of the breaker module). The ledge preferably defines an undercut that facilitates prying of the breaker module from the breaker board.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
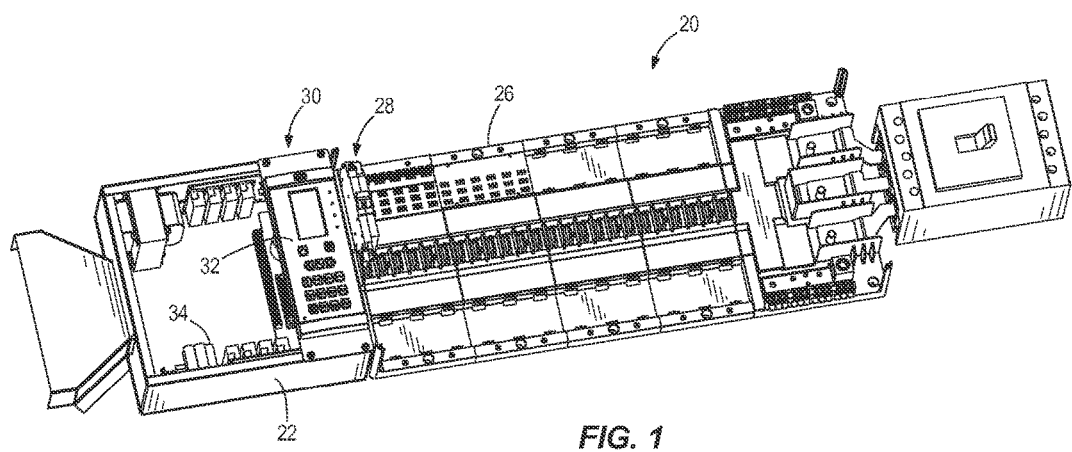
FIG. 1 is a perspective view of a circuit breaker assembly embodying the present invention.

FIG. 1 is a perspective view of a circuit breaker assembly 20 embodying the present invention. The assembly 20 includes a housing 22, a breaker board 26, breaker modules 28, a controller 30 having a control panel 32, and control circuitry 34. The illustrated housing 22 is shown with several panels removed. Many of these parts can be provided with off-the-shelf parts, but the breaker board 26 and breaker modules 28 in this embodiment are specifically designed to achieve the benefits of the present invention.

Figure 2:
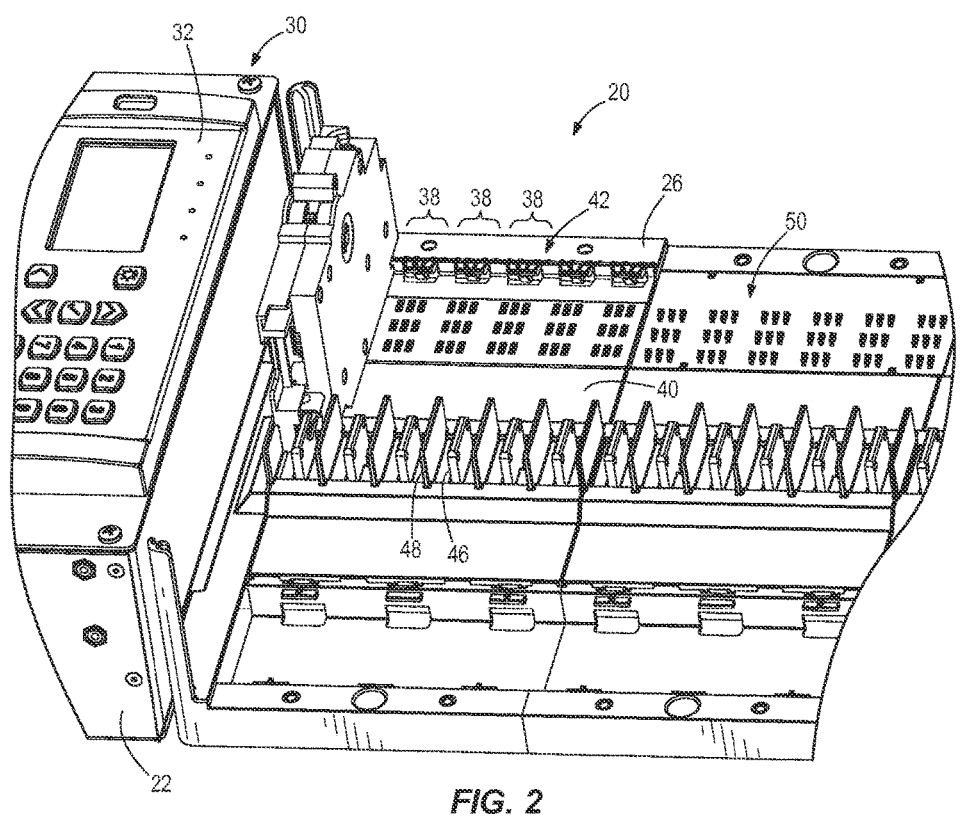
FIG. 2 is an enlarged perspective view of the assembly of FIG. 1 showing a single breaker module mounted to the breaker board.
Figure 3:
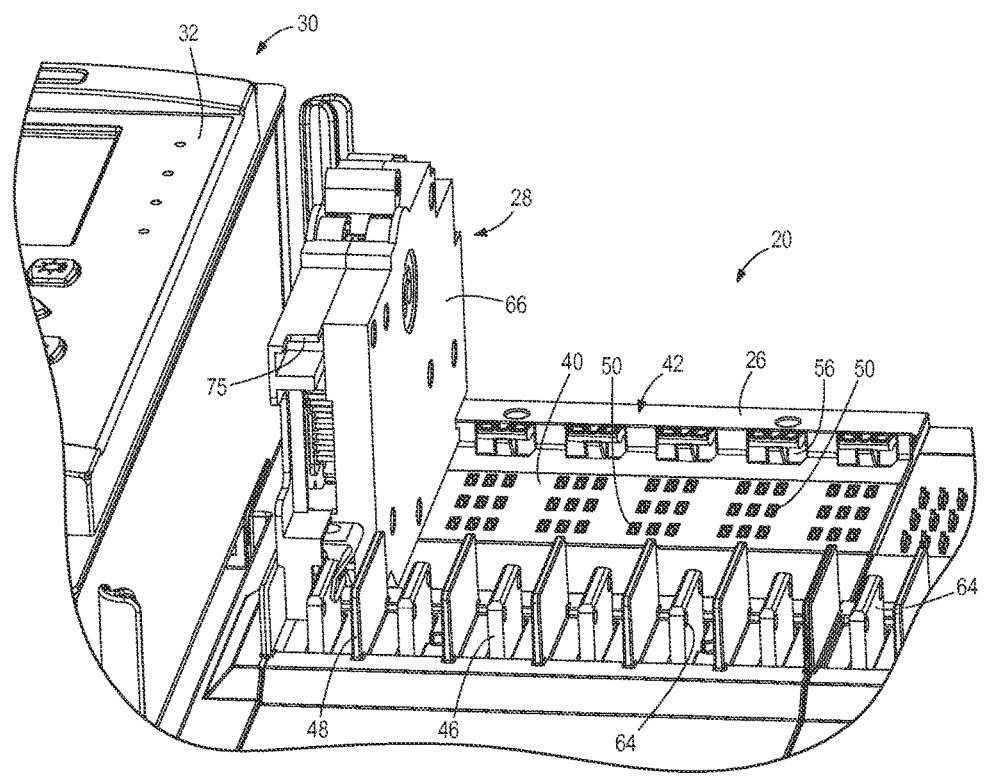
FIG. 3 is an enlarged view of FIG. 2.
Figure 4:
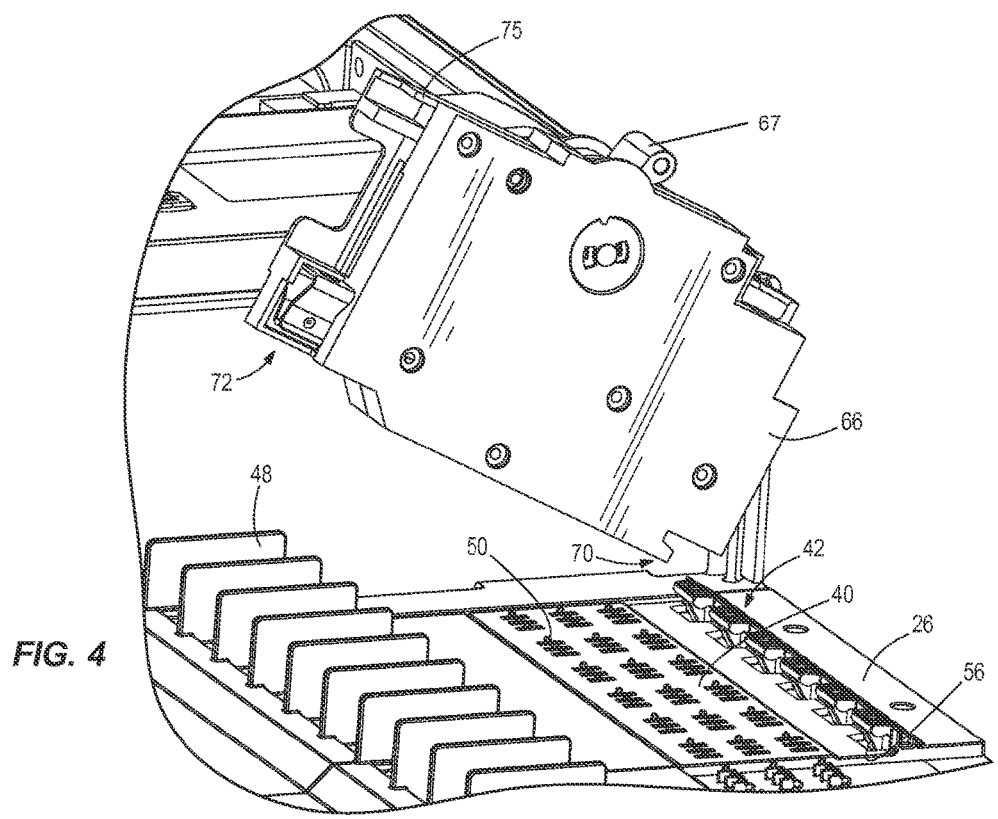
FIG. 4 shows the breaker module of FIG. 2 exploded from the breaker board.
Figure 5:
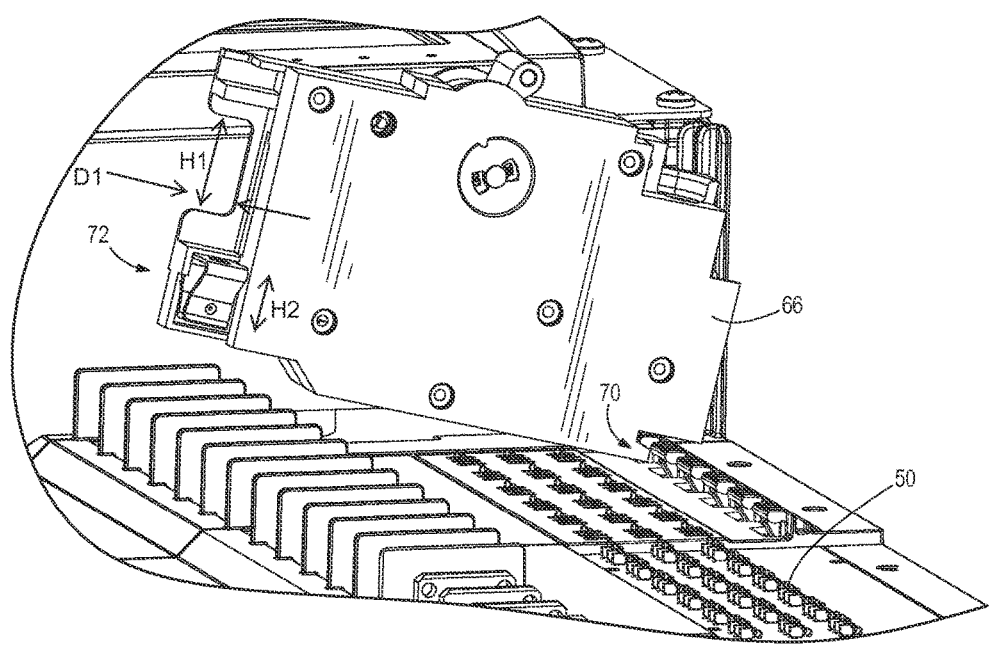
FIG. 5 shows the breaker module of FIG. 4 partially inserted into the breaker board.
Figure 6:
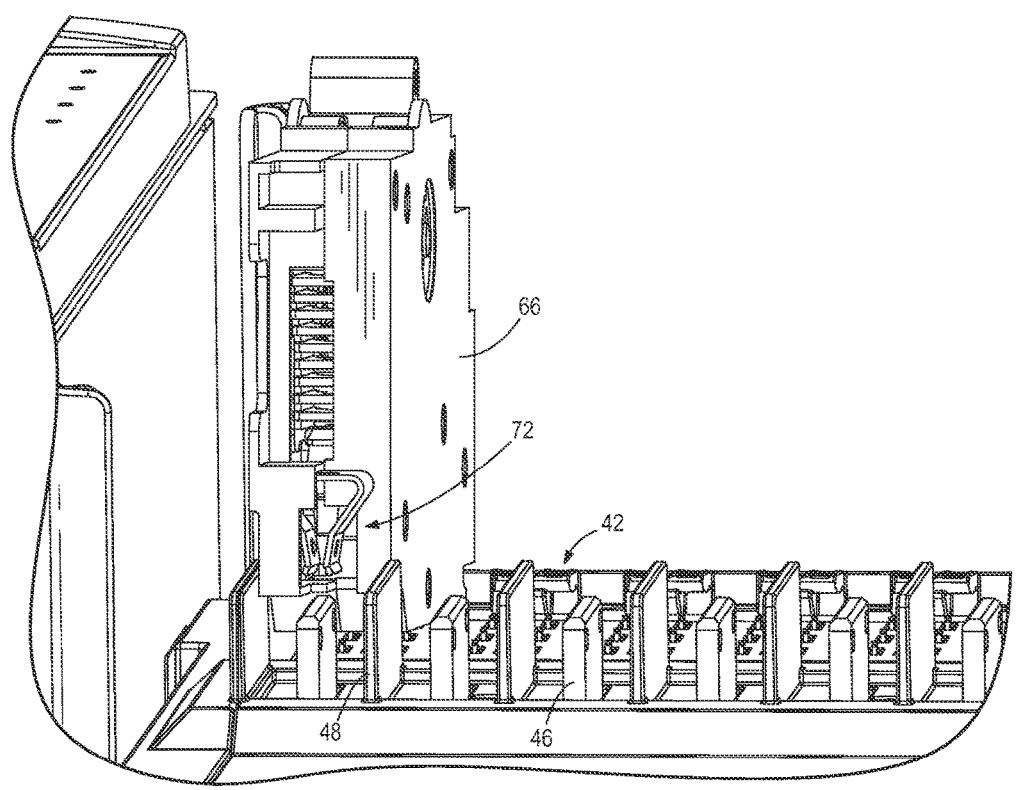
FIG. 6 shows a different view of the assembly of FIG. 5.
Figure 7:
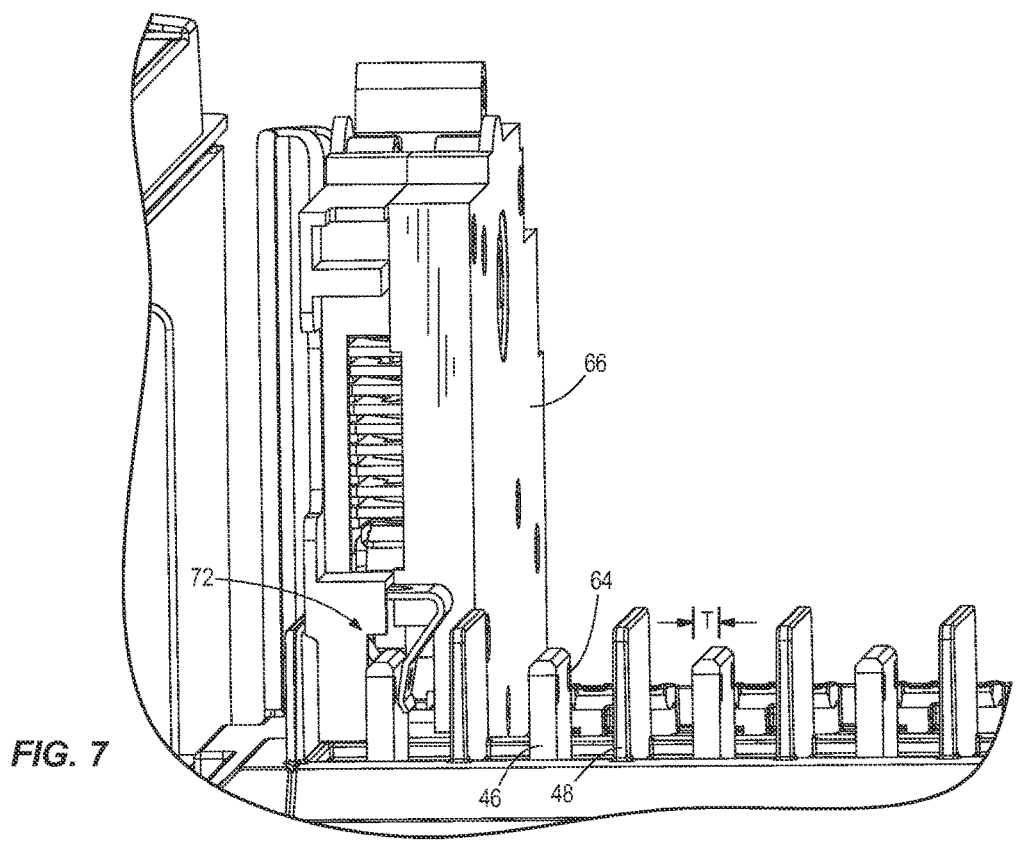
FIG. 7 shows the assembly of FIG. 6 with the breaker module fully seated into the breaker board.

Referring to FIGS. 1 and 2, the illustrated breaker board 26 includes forty-eight stations 38, including twenty-four stations along one side of the assembly and another twenty-four stations along the other side of the assembly. As such, it can be seen that each station 38 has a station 38 horizontally aligned with it to thereby create a pair of aligned stations. The stations 38 are divided into three different groups: left phase, center phase, and right phase, and each pair of horizontally aligned stations (i.e., directly across from each other, back-to-back) has the same phase. The groups of stations are arranged in an alternating pattern with the lowest pair of stations being right phase, the next pair of stations being center phase, the next pair of stations being left phase, and so on.

Figure 8:
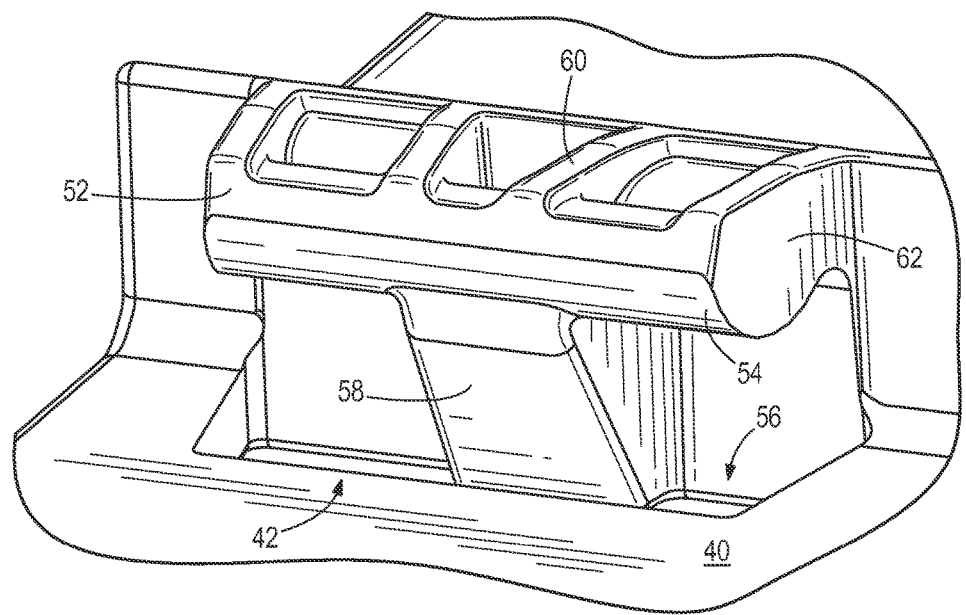
FIG. 8 is a perspective view of a mounting rail on the breaker board.
Figure 9:
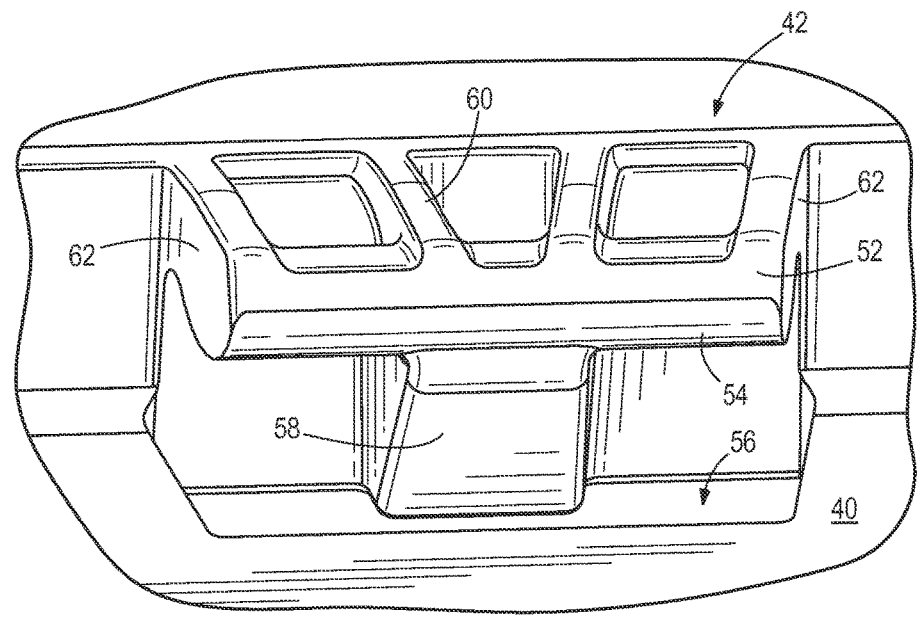
FIG. 9 is another view of the mounting rail of FIG. 8.
Figure 10:
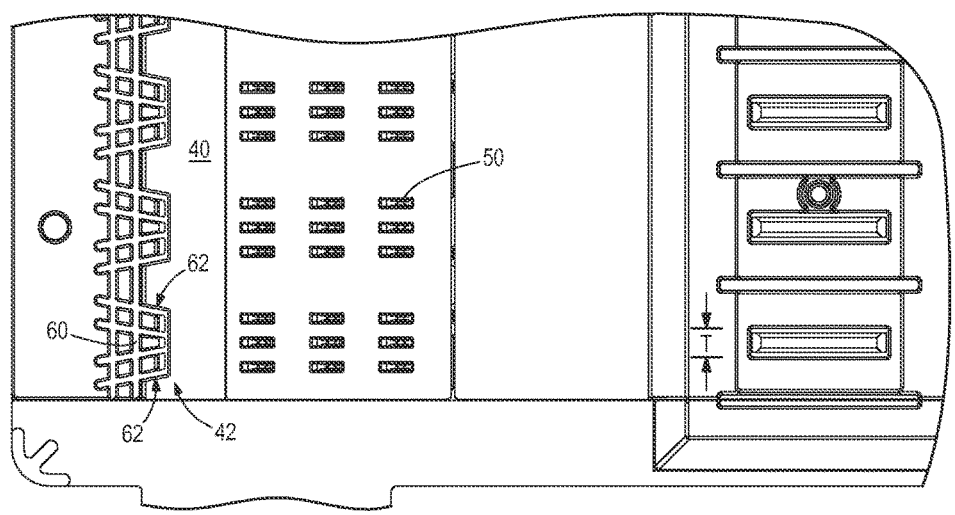
FIG. 10 is a top view of the mounting rail of FIG. 8.
Figure 11:
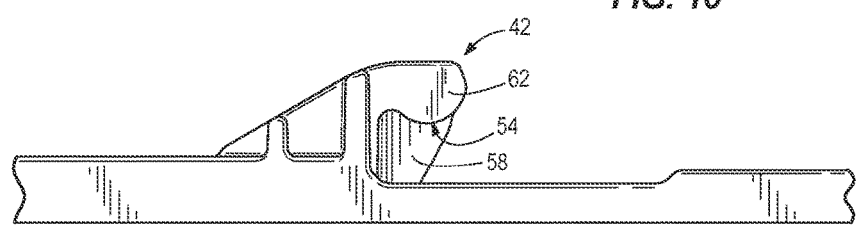
FIG. 11 is a side view of the mounting rail of FIG. 8.

As shown in FIGS. 3-7, each station 38 includes a back surface 40, a board mount in the form of a mounting rail 42, a bus bar 46, and an insulating wall 48. Each back surface 40 includes board connections 50 for providing electrical communication between the controller 30 and the breaker module 28. Referring to FIGS. 8 and 9, each mounting rail 42 includes a rail member 52 having a cylindrically curved convex surface 54 that facilitates pivoting of the breaker module 28 as it is being mounted on the breaker board 26, as described below in more detail. The back surface 40 includes a recess 56 behind each mounting rail 42. Each mounting rail further includes an alignment web 58 extending between the rail member 52 and the recess 56 to facilitate alignment of the breaker module 28 in the station 38, as described below in more detail. The outer surface of each mounting rail 42 includes reinforcement flanges 60, and the sides 62 of each mounting rail 42 are tapered to facilitate insertion of the breaker module 28 into the station 38.

The bus bar 46 of each station 38 is integrally connected to the bus bar 46 of the horizontally aligned station 38 such that the pairs of stations are in a back-to-back orientation and share a common bus bar 46. Each bus bar 46 includes an engagement feature in the form of a hole 64 (see FIGS. 3 and 7) that facilitates positive engagement of the corresponding breaker module 28, as described below in more detail.

Figure 12:
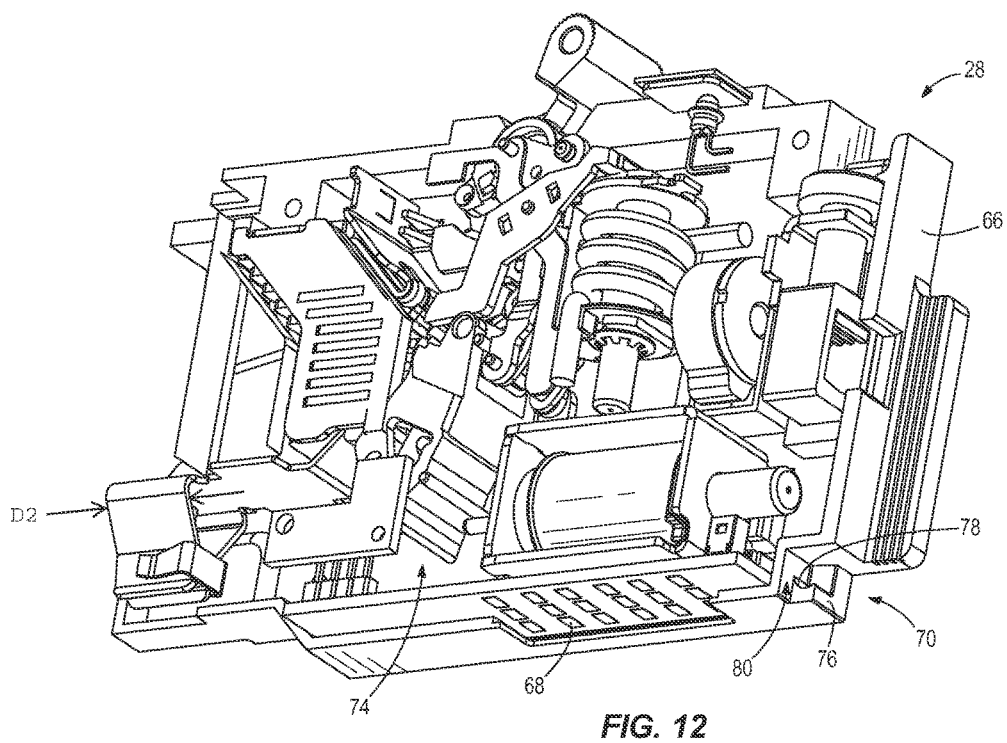
FIG. 12 is a perspective view of the breaker module with half of the housing removed.
Figure 13:
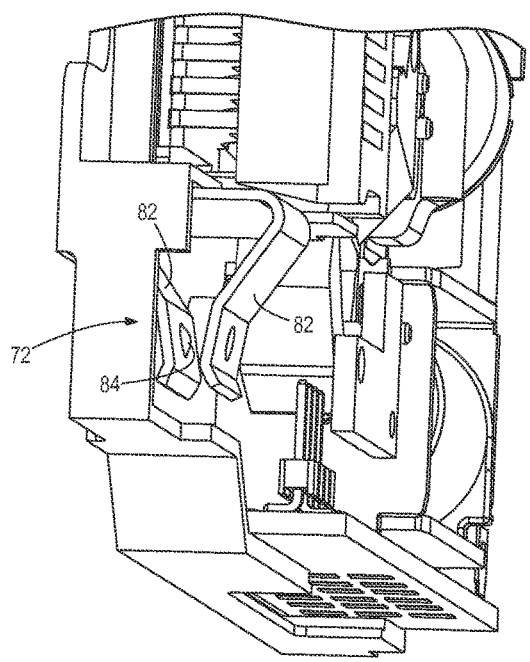
FIG. 13 is another perspective view of the breaker module of FIG. 12.
Figure 14:
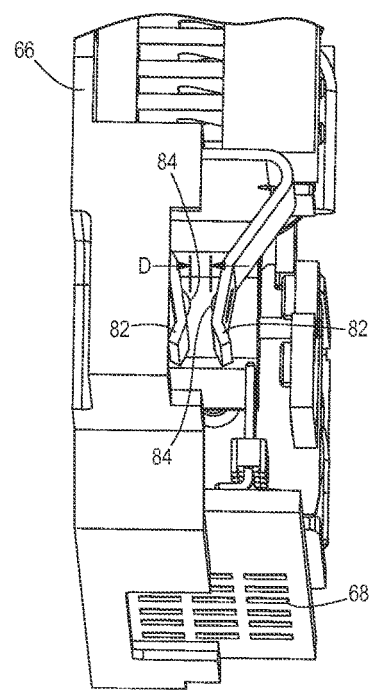
FIG. 14 is another perspective view of the breaker module of FIG. 12.

Each breaker module 28 includes a breaker housing 66, a reset lever 67 on a front side of the housing 66, an array of breaker connections 68 on a back side of the housing 66, a module mount in the form of a pivot mount 70 positioned adjacent the front side and a second end of the breaker housing 66, and a line side connector 72 positioned adjacent the back side and a first end of the breaker housing 66. In FIGS. 2-7, part of the breaker housing 66 has been truncated in order to more clearly show the line side connector 72. In FIGS. 12-14, half of the breaker housing 66 has been omitted. The breaker housing 66 contains the electrical components 74 of the breaker module 28. The breaker connections 68 are low-voltage connections that facilitate electrical communication between the controller 30 and the breaker module 28 when the breaker module 28 is mounted in the corresponding station 38. As shown in FIGS. 12-14, the breaker connections 68 are positioned between the pivot mount 70 and the line side connector 72 along the back side of the breaker module 28. In this regard, the board connections 50 and breaker connections 68 are blind mate connections that are not accessible when the breaker module 28 is mounted to the breaker board 26.

The pivot mount 70 includes two pivot members 76, each having a cylindrically curved concave surface 78 (FIG. 12) adapted to engage the convex surface 54 of the corresponding rail member 52. The pivot members 76 are separated by an alignment recess 80 dimensioned to receive the alignment web 58 when the breaker module 28 is mounted to the breaker board 26 in order to insure proper alignment of the breaker module 28 relative to the station 38.

The line side connector 72 includes two resilient conductors 82 spaced apart from each other by a distance D (see FIG. 14) that is less than a thickness T (see FIG. 7) of the bus bar 46. Each resilient conductor 82 includes an engagement feature in the form of a raised boss 84 (see FIGS. 13-14) adapted to fit into the hole 64 of the corresponding bus bar 46 in order to provide a tactile or audible indication that the breaker module 28 is fully seated into the corresponding station 38. The interaction between the boss 84 and the hole 64 can also hold the breaker module in place and prevent unwanted movement between the breaker module 28 and the bus bar 46.

Immediately above (i.e., away from the line side connector 72, the breaker housing 66 includes a cut-out 77 that creates a vent channel for the venting of plasma. The cut-out 77 has a depth D1 that is approximately the same as a Depth D2 of the conductors 82 (FIG. 12). In addition, the cut-out 77 has a height H1 that is at least as large, and preferably larger than, the height H2 of the conductors 82 (see FIG. 5).

In operation, a breaker module 28 is inserted into a station 38 by first inserting the pivot members 76 under the rail member 52 with the alignment web 58 being received in the alignment recess 80. The breaker module 28 is then pivoted downward toward the back surface 40 of the station 38, thereby bringing the line side connector 72 into engagement with the corresponding bus bar 46. Further downward pivoting of the breaker module 28 results in the bus bar 46 being received between the two resilient conductors 82 until the raised bosses 84 snap into the hole 64 in the bus bar 46. Coupling the breaker module 28 to the station 38 in this manner will inherently result in the breaker connections 60 beings electrically coupled to the board connections 50 to facilitate communication between the controller 30 and the breaker module 28.

Figure 15:
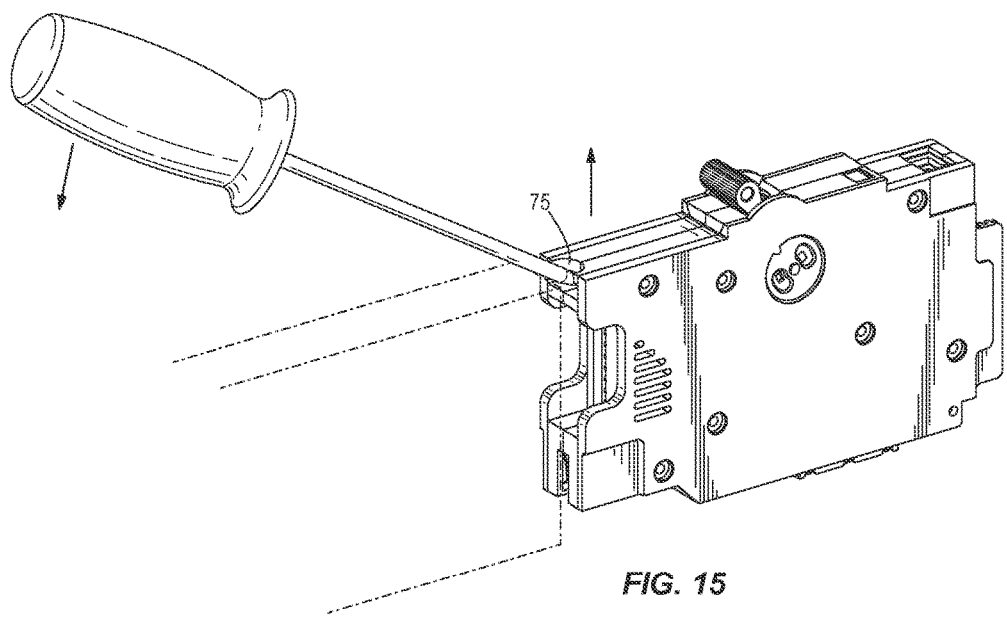
FIG. 15 is a perspective view showing removal of a breaker module from the breaker board.

Referring to FIG. 15, the breaker module 28 includes a ledge 75 that facilitates disengaging the beaker module 28 from the breaker board 26. Specifically, the ledge 75 creates an undercut adapted to receive a pry bar, such as a flat head screwdriver, that can be leveraged off the adjacent breaker module in order to facilitate disengagement of the resilient conductors 82 from the corresponding bus bar 46.

Each breaker module 28 is a fully magnetic breaker with solenoid-actuated load switching and three positions—on, off, and tripped. Each breaker module 28 can be manually moved to the on or off positions at any time. The circuit breaker assembly 20 can also be controlled by the controller 30 that is remote from the breaker modules 28. The controller 30 receives information from a variety of sources and uses that information to determine the operating characteristics of the breaker assembly 20. For example, the controller 30 can receive commands (e.g., over a wired network or wirelessly over a wi-fi network) that dictate the operating parameters (e.g., whether to turn on, off, or re-set) of one or more breaker modules 28. The illustrated controller 30 is programmed to prevent the remote re-setting of a breaker module 28 if the breaker module 28 was tripped. In other words, when one of the illustrated breaker modules 28 is tripped, it can only be reset manually at the breaker module 28. In addition, the controller 30 allows the breaker to be turned on manually even if the breaker module 28 was turned off or tripped remotely (e.g., even if the controller dies).

Figure 16:
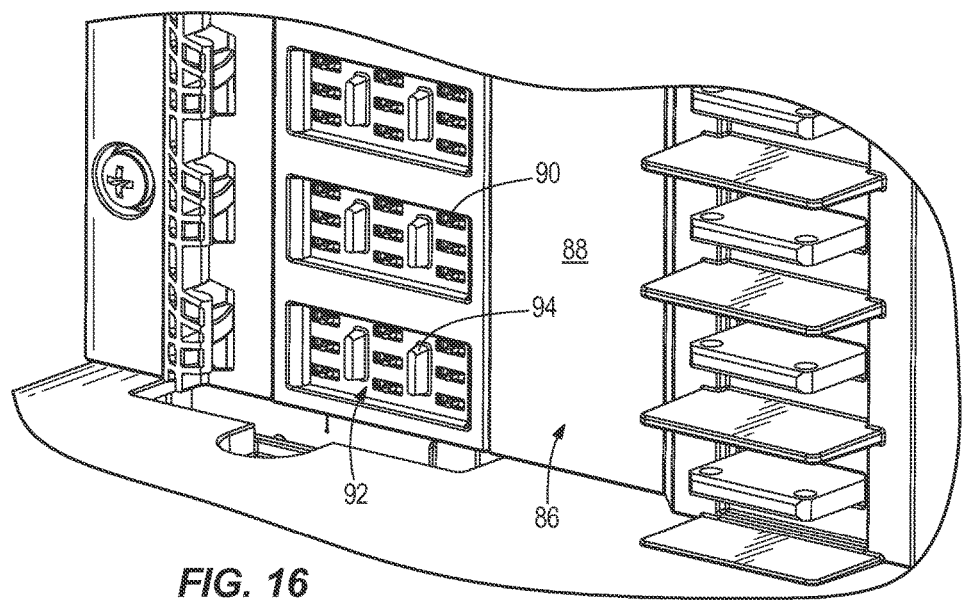
FIG. 16 is a partial perspective view of a breaker board corresponding with a second embodiment of the invention.
Figure 17:
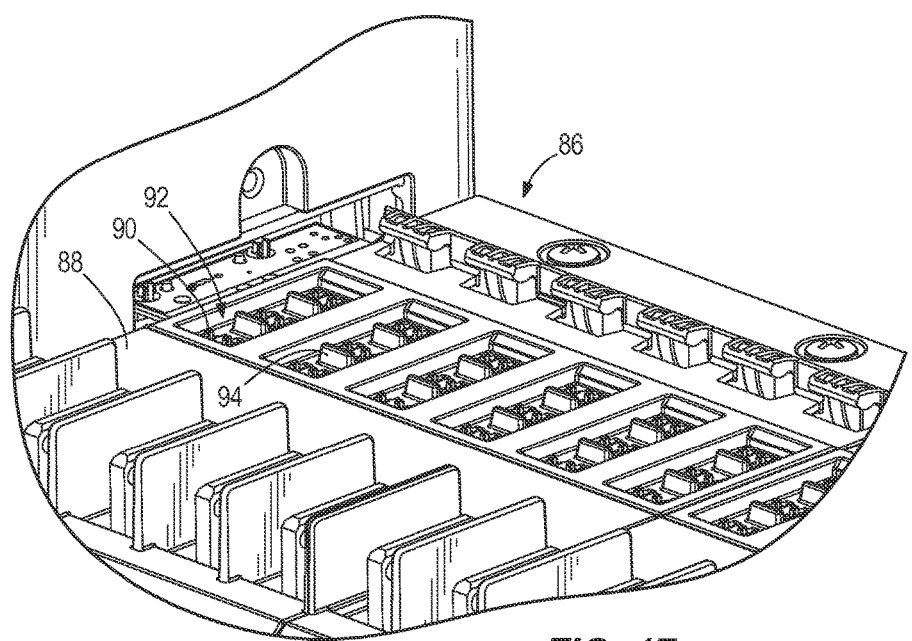
FIG. 17 is a different partial perspective view of the breaker board of FIG. 15.

FIGS. 16-17 illustrate an alternative breaker board 86 having a back surface 88 with board connections 90 that are positioned in a well 92 (i.e., offset from a plane defined by the back surface 88). Two raised stanchions 94 are positioned in the well 92.

Figure 18:
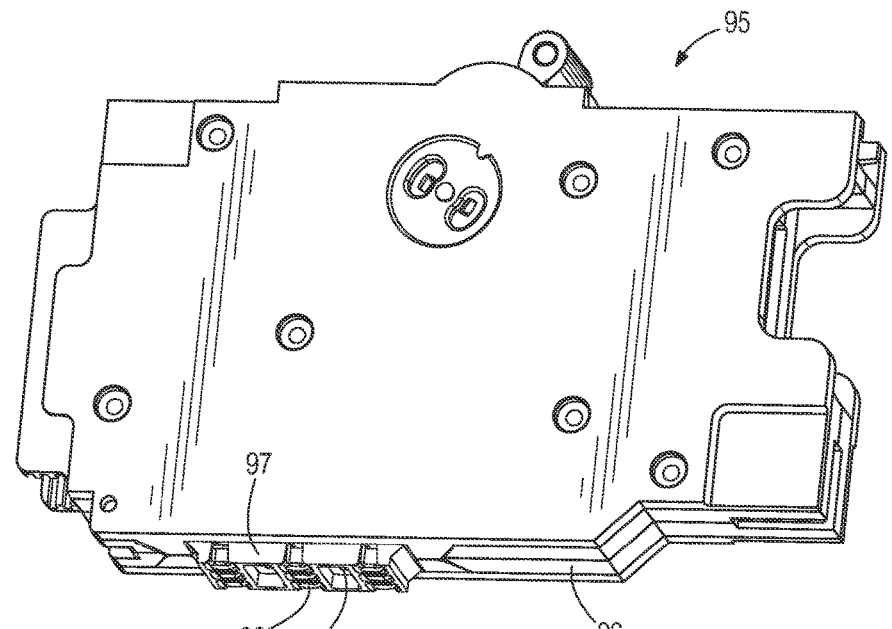
FIG. 18 is a perspective view of a breaker module designed to fit into the breaker board of FIGS. 15-16.
Figure 19:
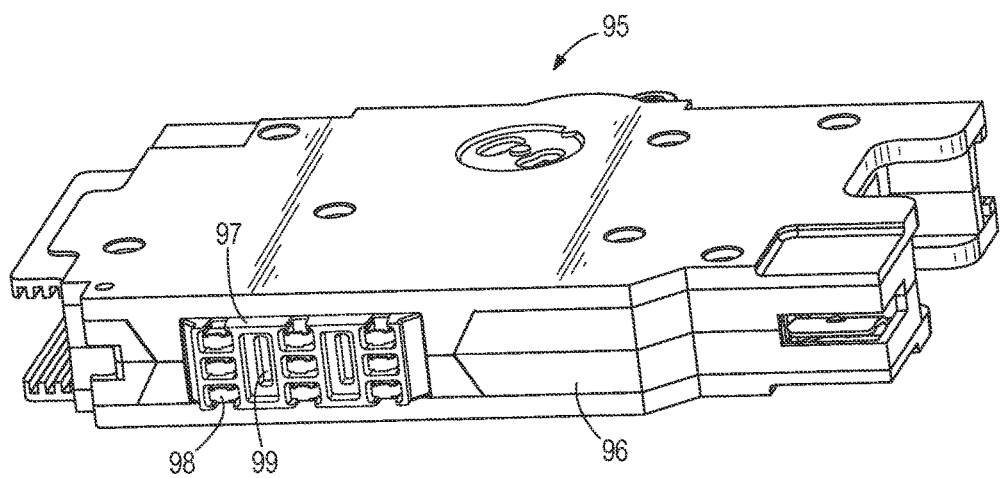
FIG. 19 is a different perspective view of the breaker module of FIG. 17.

FIGS. 18-19 illustrate an alternative beaker module 95 having a bottom surface 96 and a protruding platform 97 that contains breaker connections 98 adapted to engage the board connections 90 when the breaker module 95 is mounted to the breaker board 86 of FIGS. 16-17. The platform 97 includes recesses 99 dimensioned to receive the stanchions 94 when the breaker module 95 is mounted to the breaker board 86.

Thus, the invention provides, among other things, a breaker assembly 20 having breaker modules 28 that can be easily snapped into place and that provides remote control capabilities while limiting remote reset when the breaker has tripped and allowing full manual control at the breaker module 28. Various features and advantages of the invention are set forth in the following claims.

The invention claimed is:

1. A breaker assembly comprising:
a breaker board having:
 a bus bar including a first engagement feature,
 a board mount spaced from the bus bar,
 a back surface between the bus bar and the board mount,
 a well recessed into the back surface between the bus bar and the board mount, and
 board connections positioned in the well between the bus bar and the board mount; and
a breaker module having:
 a breaker housing defining a bottom surface,
 a line side connector including a second engagement feature engaging the first engagement feature to inhibit separation of the breaker module from the breaker board,
 a module mount adapted to engage the board mount,
 a platform protruding from the bottom surface between the line side connector and the module mount, and
 breaker connections recessed into the platform positioned between the line side connector and the module mount and adapted to be engaged with the board connections,
wherein the platform is dimensioned to mate into the well to facilitate coupling of the breaker connections to the board connections.

2. The breaker assembly of claim 1, wherein the first engagement feature comprises a recess in the bus bar.

3. The breaker assembly of claim 1, wherein the second engagement feature comprises a protrusion on the line sided connector.

4. The breaker assembly of claim 1, wherein the board mount comprises a mounting rail spaced from the bus bar, and wherein the module mount comprises a pivot mount pivotally engaging the mounting rail.

5. The breaker assembly of claim 4, wherein the pivot mount includes a first alignment feature and the mounting rail includes a second alignment feature engaging the first alignment feature.

6. The breaker assembly of claim 5, wherein the first alignment feature comprises an alignment recess and the second alignment feature comprises an alignment web positioned in the alignment recess.

7. The breaker assembly of claim 4, wherein the line side connector is adjacent a first end of the breaker module and the pivot mount is adjacent a second opposing end of the breaker module, and wherein the breaker module further comprises a ledge positioned adjacent the first end.

8. The breaker assembly of claim 7, wherein the ledge is adjacent a front side of the breaker module.

9. The breaker assembly of claim 7, wherein the ledge defines an undercut that facilitates prying of the breaker module from the breaker board.

10. A breaker assembly comprising:
a breaker board having a bus bar, a board mount spaced from the bus bar, a back surface between the bus bar and the board mount, a well recessed into the back surface between the bus bar and the board mount, and board connections positioned in the well; and
a breaker module having a breaker housing defining a bottom surface, a line side connector adapted to engage the bus bar, a module mount adapted to engage the board mount, a platform protruding from the bottom surface between the line side connector and the module mount, and breaker connections recessed into the platform and adapted to be engaged with the board connections, wherein the platform is dimensioned to mate into the well to facilitate coupling of the breaker connections to the board connections.

11. The breaker assembly of claim 10, wherein the line side connector is adjacent a first end of the breaker module and the module mount is adjacent a second opposing end of the breaker module, and wherein the breaker module further comprises a ledge positioned adjacent the first end.

12. The breaker assembly of claim 11, wherein the ledge is adjacent a front side of the breaker module.

13. The breaker assembly of claim 11, wherein the ledge defines an undercut that facilitates prying of the breaker module from the breaker board.

14. The breaker assembly of claim 10, wherein the breaker board further includes a stanchion positioned in the well, wherein the platform includes a recess dimensioned to receive the stanchion.

15. The breaker assembly of claim 10, wherein the well includes a first sloped wall and wherein the platform includes a second sloped wall adapted to mate with the first sloped wall.

* * * * *